UNITED STATES PATENT OFFICE.

EULALIE C. LARSEN, OF SINGAPORE, INDIA, ADMINISTRATRIX OF AIME ARNAUD, DECEASED.

METHOD OF EXTRACTING GUTTA-PERCHA.

No. 836,512.        Specification of Letters Patent.        Patented Nov. 20, 1906.

Application filed August 23, 1905. Serial No. 375,483.

*To all whom it may concern:*

Be it known that I, EULALIE C. LARSEN, a citizen of France, and a resident of Singapore, Straits Settlements, India, am administratrix of the estate of AIME ARNAUD, deceased, (late a citizen of France, and a resident of Singapore, Straits Settlements, India, as by reference to the duly-certified copy of letters of administration hereto annexed will more fully appear,) who in his lifetime did invent certain new and useful Improvements in Methods of Extracting Gutta-Percha, of which the following is a full, clear, and exact description.

The present invention relates to a system or process of extracting gutta-percha contained in the raw state in leaves and buds of the isonondra tree and other varieties of trees, vines, and creepers capable of yielding gum.

The principal object of the present invention is to provide a system of treating the substances above mentioned in order to extract gutta-percha by a mechanical method without the use or without the extensive use of oil, salt, or other chemicals.

I will describe a preferred way of carrying out the invention.

The green or dry leaves are mechanically crushed by means of a pair of metallic cylinders revolving in opposite directions and at unequal speed, or by means of any other kind of mill capable of reducing the leaves and twigs to pulp. To this pulp is added from fifteen to twenty per cent. of cut-up gutta, according to the richness of the leaves under treatment; and to this mixture may be added, if desired, twenty per cent. of castor-oil; but I prefer to omit this ingredient. The mixture is then stirred and intimately combined. After the mixture is treated in this manner it is transferred to an air-tight boiler and boiled under pressure at a temperature of from preferably 110° to 125° centigrade during a time varying from one to one and one-half hours, according to the quality, age, and condition of the leaves and buds under treatment. This completely amalgamates by heat all of the gutta contained in the pulp with the other ingredients. When sufficiently boiled, the pulp is transferred to the mixing-rolls, having cast-iron hollow cylinders heated to about 100° through the medium of a current of steam. A thin stream of cold water is allowed to fall on the contacting points of the mixing-rolls and draws all the organic matter away from the gutta thus obtained. This cutting up and washing is continued until the gutta has attained the required degree of purity. In case oil has been employed in the manufacture the operation is terminated by throwing the resulting material in a boiler with water saturated with an alkaline salt and keeping it at about 100° for the purpose of withdrawing the oil contained in the gutta and saponifying it; but the invention is capable of being carried out without the use of the salt.

It has been demonstrated in practice that gutta-percha prepared in this way is of a superior quality and is pure and ready for use at the end of the operation; furthermore, that it is free from all risks of oxidation.

The addition of the cut-up gutta to the leaves under treatment assists in the coalescing of the rubber particles, said particles having considerable attraction for each other, and for the gutta, thus increasing the yield from the leaves.

Having thus described the invention, what is claimed as new, and desired to be secured by Letters Patent, is—

1. A process of treating leaves for the purpose of extracting gutta-percha, said process comprising mechanically crushing the leaves to reduce them to a pulp, adding gutta in small pieces, and boiling.

2. A process of extracting gutta-percha from isonondra leaves and buds, said process consisting in mechanically crushing the raw material to reduce it to a pulp, adding from fifteen to twenty per cent. of gutta in small pieces, thoroughly mixing the composition, boiling it at a temperature between 110° and 125° centigrade, and finally cutting up and washing the resultant compound by means of heated rollers and in the presence of a stream of cold water.

In testimony whereof I have signed my name to this specification in the presence of two subscribing witnesses.

EULALIE C. LARSEN,
*Administratrix of the Estate of Aime Arnaud, deceased.*

Witnesses:
   WILLIAM ALEXANDER MACKENZIE,
   ALBERT EDWIN DAY.